March 15, 1960     E. C. DISTLER     2,928,666
APPARATUS FOR HANDLING SHELL CASINGS AND THE LIKE
Filed Sept. 13, 1957     5 Sheets-Sheet 1

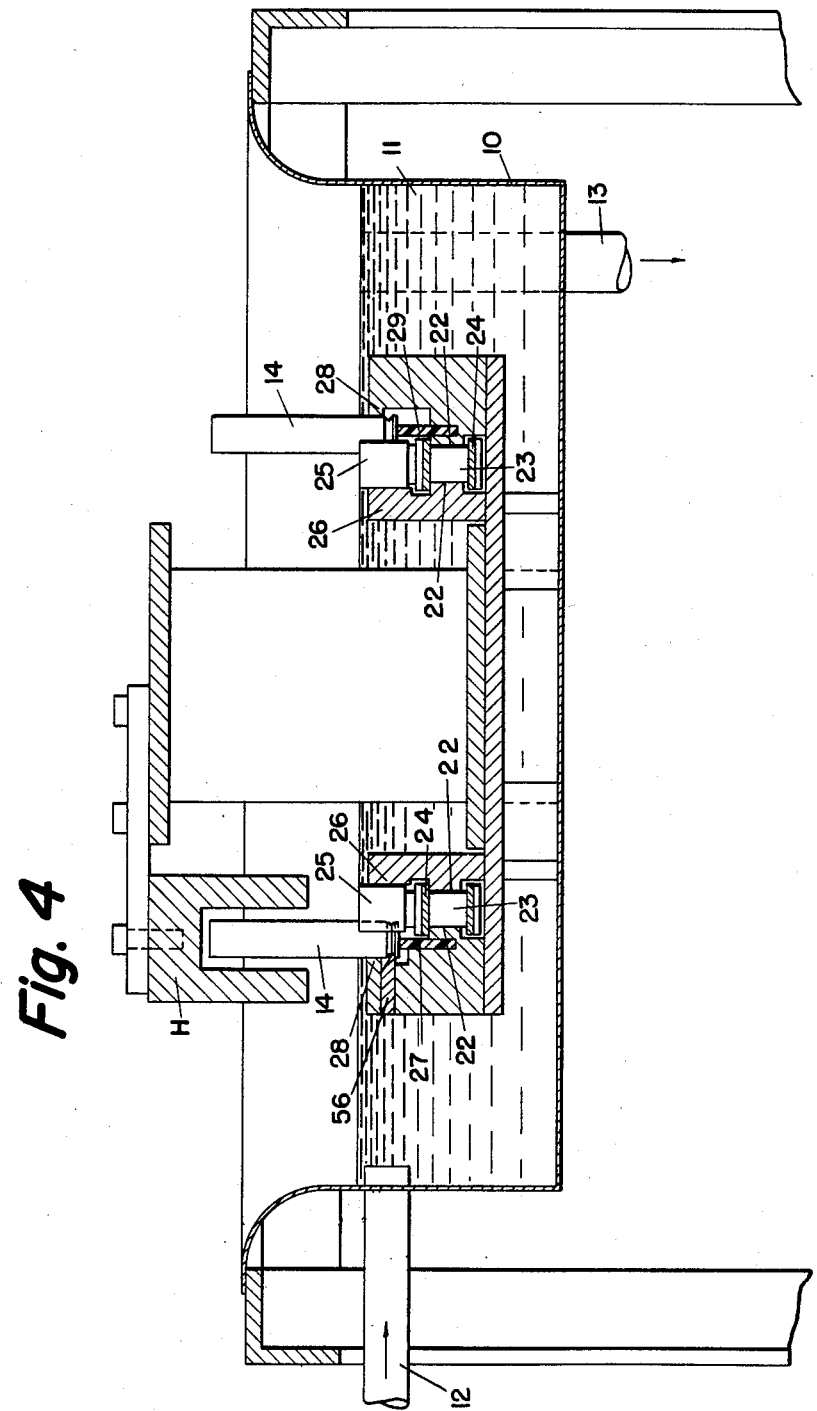

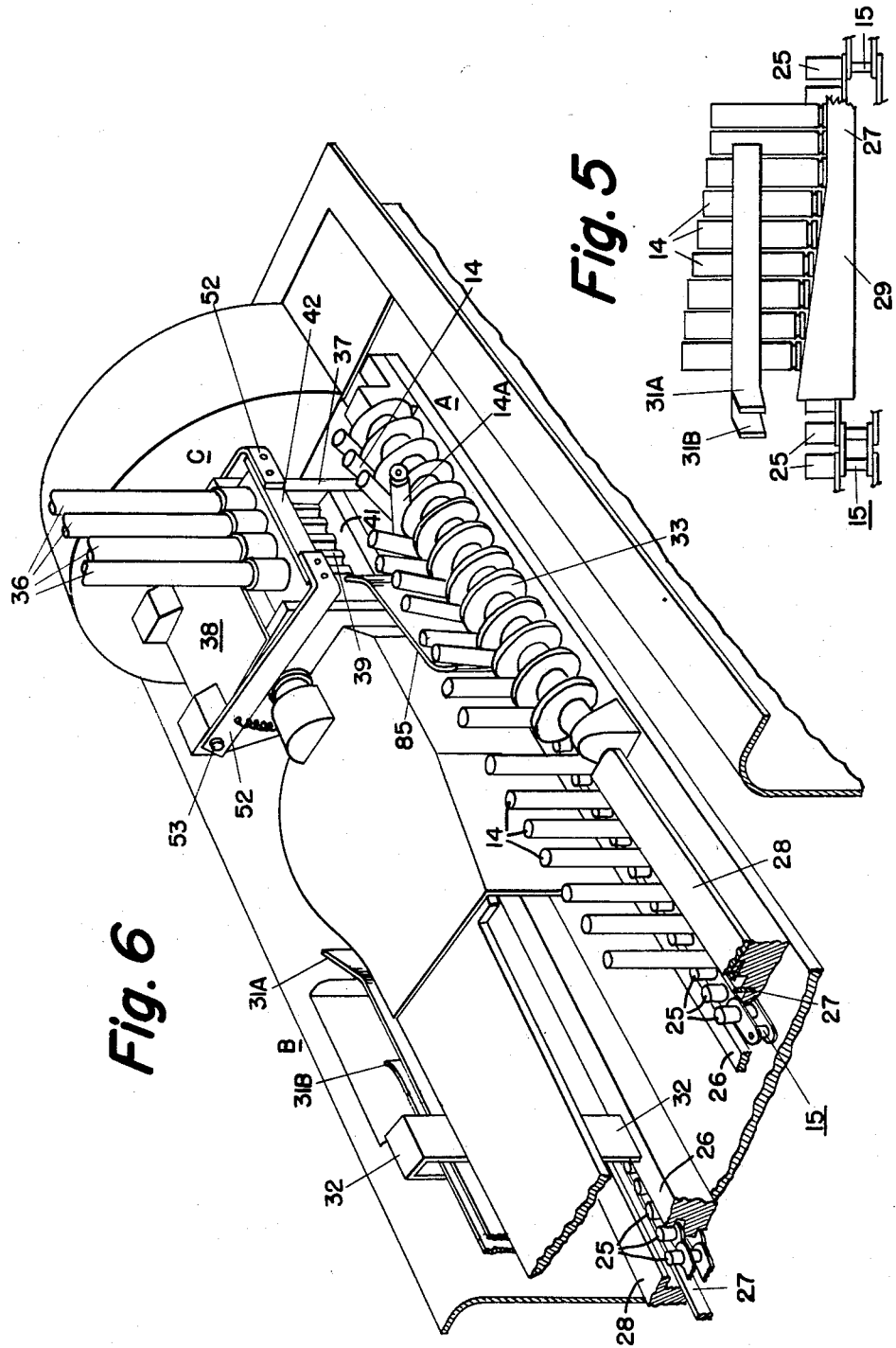

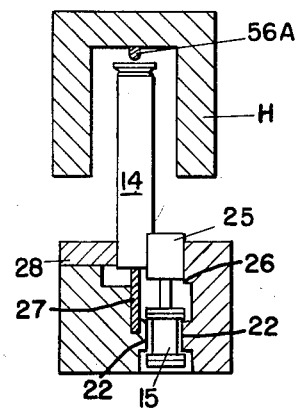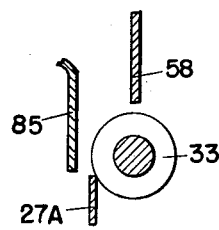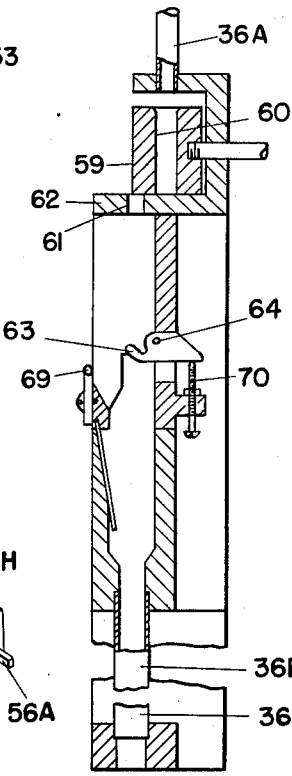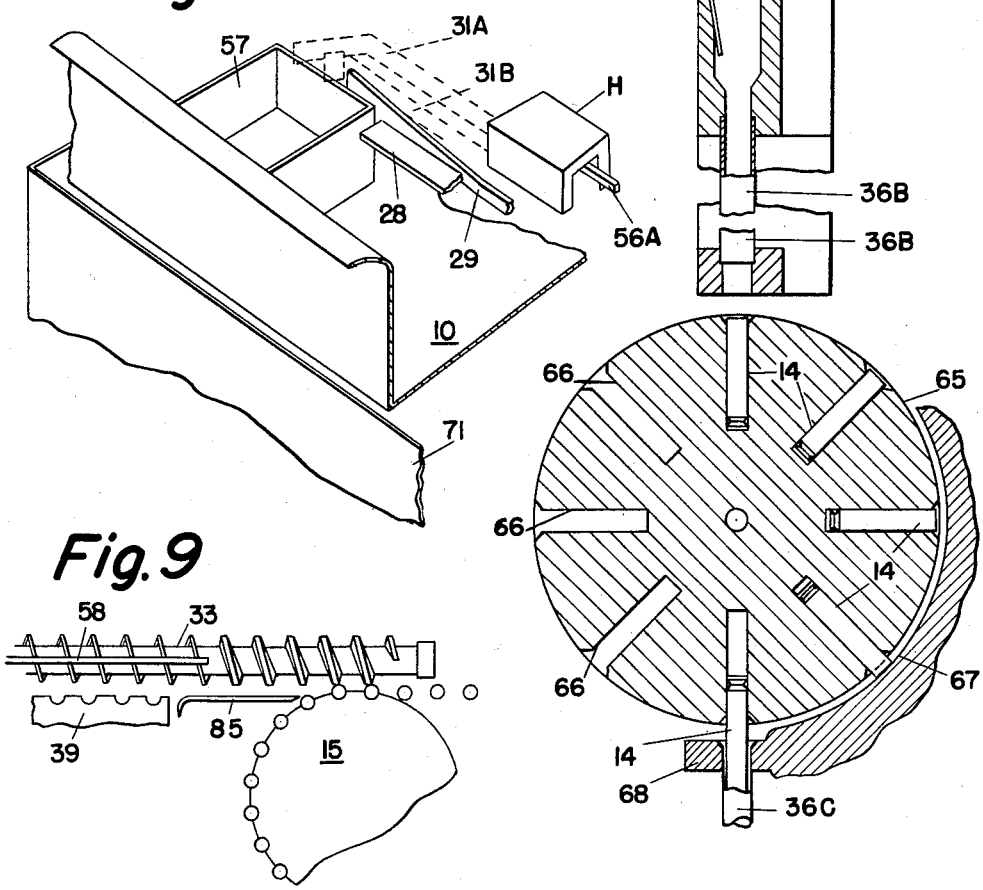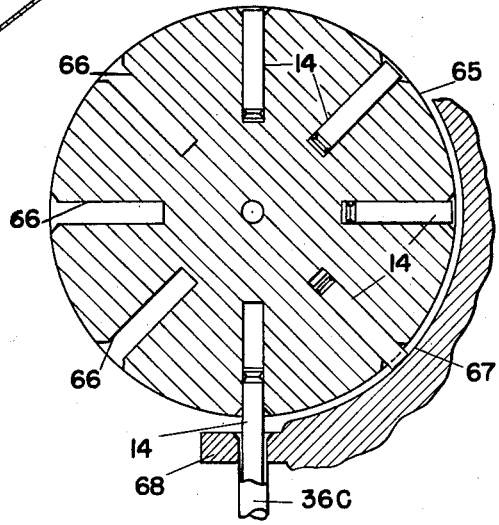

United States Patent Office 2,928,666
Patented Mar. 15, 1960

2,928,666

APPARATUS FOR HANDLING SHELL CASINGS AND THE LIKE

Edward C. Distler, Rydal, Pa., assignor to Jennings Machine Corporation, Philadelphia, Pa., a corporation of Pennsylvania Application September 13, 1957, Serial No. 683,883

9 Claims. (Cl. 263—6)

The present invention relates to apparatus suited to provide precise positioning, proper orientation and high-speed handling of shell casings and the like during their manufacture.

In the processing of shell casings, it is necessary selectively to heat-treat one end of the casings between successive forming or machining operations, specifically, and by way of example, before the open ends of the casings are reduced in diameter by a drawing operation, they must be annealed to reduce the hardness induced during prior processing steps: at another stage of manufacture of the casings, their closed or primer ends must be hardened.

In accordance with the present invention as utilized in such annealing, the casings in vertical side-by-side relation are fed in continuous stream with their lower closed ends submerged in a cooling liquid and with their upper open ends passing through a heating zone. During their movement in the direction of feed, the vertically positioned casings are rotated about their respective vertical axes to insure uniformity of the heat-treatment of their upper ends and enhancement of the transfer of heat from their lower submerged ends to the cooling liquid. More particularly, the transport of the casings through and beyond the heating zone to a discharge station is effected by an endless conveyor system having associated track or guide structure which cooperates with the casings to effect their aforesaid rotation while closely maintaining the relative positions of the casings with respect to each other, to the heating means, and to the cooling liquid. The conveyor components engaged by the heated casings are also submerged in the cooling liquid to maintain them, throughout a long sustained run, at suitably low temperature below that of the upper ends of the casings being heat-treated. For hardening of the primer ends of the casings, essentially the same conveyor and track arrangement may be used to feed the casings in vertical side-by-side relation with their closed or primer ends uppermost for heating of the closed ends during passage through the heating zone and to effect rotation of the vertically disposed casings during heating of their closed ends.

Further, in accordance with the invention, the casing feeding means includes a reciprocating slide and a continuously rotating worm synchronized with the endless conveyor to provide a smoothly continuous supply of casings to the conveyor from a multiplicity of sources of supply of casings. As used in annealing, the reciprocating slide and the feed worm also cooperate to reject any improperly oriented casings before they can be fed to the heat-treating zone. As used in hardening, the rejection of improperly oriented casings is effected in advance of the reciprocating slide.

The invention further resides in apparatus having novel and useful features of construction, combination and arrangement hereinafter described and claimed.

For a more complete understanding of the invention, reference is made in the following description to the accompanying drawings in which:

Fig. 4 is an end elevational view taken on line 4—4 of Fig. 1;

Fig. 5 is a detail view in side elevation of parts shown in Figs. 1 and 4;

Fig. 6 is a perspective view of apparatus shown in preceding figures;

Fig. 7 is a detail sectional view in end elevation illustrating a modification of parts shown in Fig. 4;

Fig. 8 is a fragmentary perspective view illustrating a modified discharge station for the apparatus of Figs. 1 to 5;

Fig. 9 is a fragmentary plan view illustrating a modified transfer station for the apparatus of Figs. 1 to 5;

Fig. 10 is a fragmentary end-elevational view showing in section parts appearing in Fig. 11; and Fig. 11 is a sectional view in side elevation of inverting and rejection mechanism for addition to the apparatus of Figs. 1 to 5.

Figure 1:
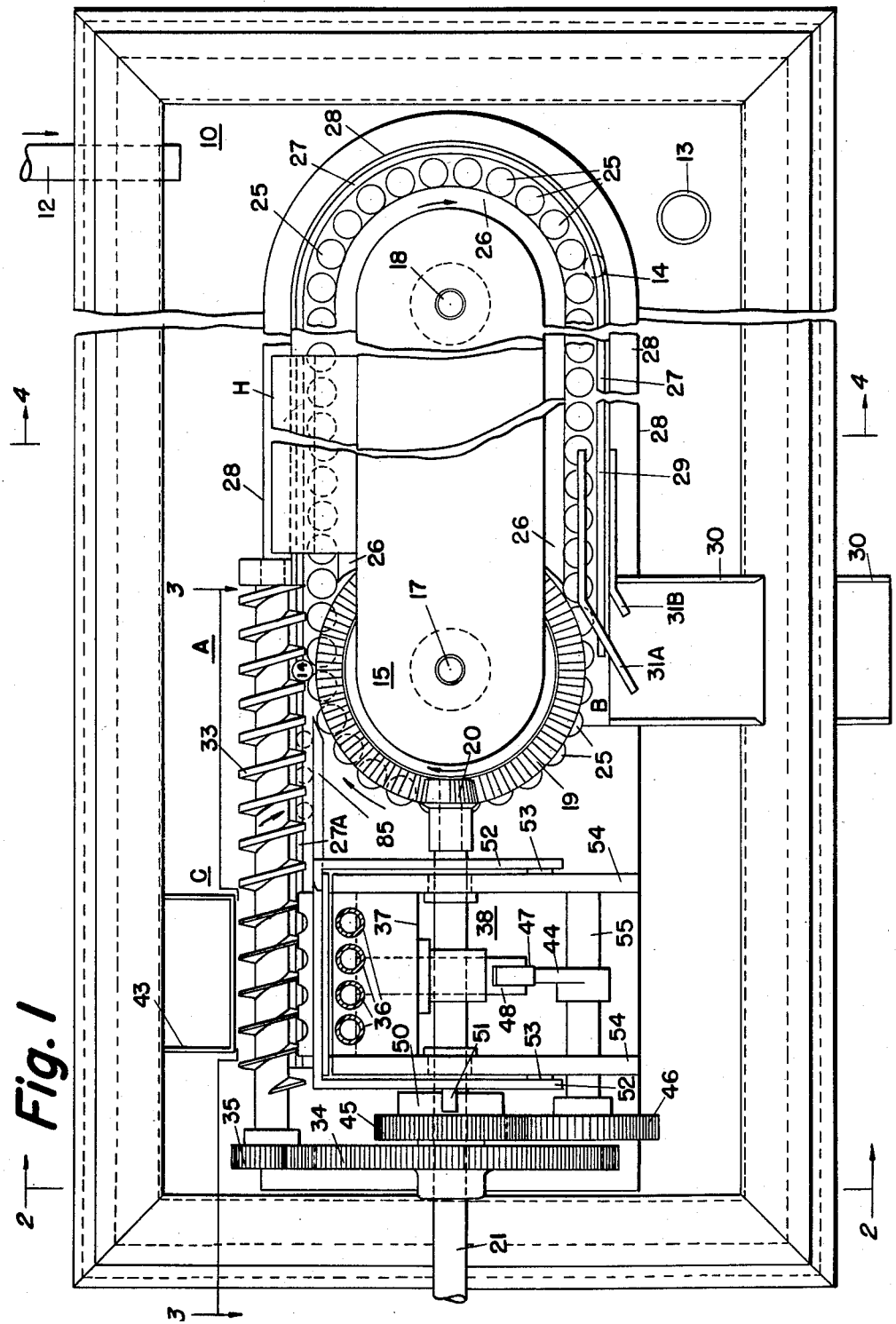
Fig. 1 is a plan view of a preferred embodiment of the apparatus.

Referring to the drawings, the tank 10 may be partially filled with a suitable cooling liquid 11, such as water, continuously supplied as by inlet pipe 12 and maintained at the desired level by the overflow or outlet pipe 13. The shell casings 14 to be treated are transported side-by-side in vertical position, with their lower closed primer-ends below the surface of the liquid, by an endless conveyor 15. Preferably and as shown, the conveyor is of the chain type extending over sprockets whose shafts 17 and 18 are vertically disposed adjacent opposite ends of tank 10. The bevel gear 19 attached to shaft 17 (Figs. 1 and 3) engages the pinion 20 attached to the main drive shaft 21 which extends to a motor or other driving means (not shown).

For at least a substantial part of its path from the shell-receiving station A to the shell-discharging station B, any substantial sidewise or vertical displacement of the conveyor 15 is precluded by the track or guide members 22, 22 which, as best shown in Fig. 4, serve as continuous stops engageable by the cross-bars 23 and link members 24 of the conveyor chain. From the upper face of the conveyor chain, there extends a plurality of short rollers 25 rotatable about vertical axes spaced along the length of the conveyor chain and spaced to define shell-receiving gaps or pockets along the outer periphery of the conveyor. The track member 26 extending adjacent the inner periphery of the conveyor from the receiving station to the discharge station engages the rollers 25 to effect their rotation for purposes later described. The rollers 25 may be of metal or preferably of heat-insulating material, such as ceramic or nylon.

The depth to which the shell casings 14 are immersed in liquid 11 during their transport by conveyor 15 is determined by the rail 27 which engages the bottom ends of the casings to support them. The track or guide 28 adjacent the outer periphery of conveyor 15 from the receiving station A to the discharge station B engages the shells to retain them in vertical position and in engagement with the rollers 25 of the conveyor. The track member 28 may be of metal or preferably of heat-insulating material, such as nylon or Fiberglas. Thus, as the shell casings are moved by conveyor 15 along the path from the receiving station to the discharge station, they are rotated about their individual vertical axes due to the engagement of each of the casings with a pair of conveyor rollers 25 and the track 28. Such engagement is insured despite the flexibility of the conveyor chain or wear of the roller axles or bearings by the inner track 26. The roller-engaging surface of track member 26 may be faced with rubber, or equivalent resilient material, to enhance the coefficient of friction.

During transport of the casings by the conveyor 15, their upper open ends are passed through a heating zone in which their temperature is raised, as by an alternating magnetic field or by gas flames, to an elevated temperature suited for annealing. In Figs. 1 and 4, the heating zone is diagrammatically illustrated as defined by the housing H of a heating device. As indicated in Fig. 4, about the upper half of the casing is within the heating zone and less than about the lower quarter of the casing is below the liquid and there engaged by the conveyor rollers and track structure.

The rotation of the casings about their axes as the continuous stream of casings is moved in a predetermined path in the heating zone, insures uniformity of heating of the successive casings and proper uniformity of the temperature-gradients lengthwise of the individual casings. With the lower ejector-grooved ends of the casings immersed below the surface of liquid 11, there is prevented undue temperature rise and the primer-ends of the casings therefore desirably remain in hard or unannealed state. The rotation of the casings also contributes to uniformity of transfer of heat from the lower ends of the casings to the liquid because of the enforced circulation or stirring of it. It is also to be noted that the conveyor and guide parts in contact with the heated casings are submerged in liquid 11, so that their temperature remains low despite a long continuous heat-treating run.

The hold-down rail 56 (Fig. 4) extends into the ejector groove of the casings to overcome the magnetic force of the induction heating field which tends to lift the casings upwardly from the conveyor. This force may be as great as one pound per casing.

After the casings leave the heating zone, their upper ends are exposed to air at room or ambient temperature for an appreciable period of time before they reach the discharge station B. Since the rotation of the casings continues after they leave the heating zone, the air and liquid respectively in contact with the upper and lower ends of the casings are stirred or circulated to afford uniformity of cooling. By the time the casings reach the discharge station, their upper ends are annealed and the individual casings, as a whole, are sufficiently reduced in temperature to withstand the impacts incident to discharge and subsequent normal handling.

As the casings approach the discharge station at the end of the cooling zone, they are lifted upwardly from the path of the conveyor rollers 25 by the ramp extension 29 of the lower guide rail 27 (Figs. 1, 4, 5 and 6) and are directed outwardly from the conveyor into a discharge chute 30 by the guides 31A, 31B which respectively engage the opposite sides of the casings being moved upwardly of the ramp 29 by conveyor 15. The discharge guides 31A, 31B may be supported as by bracket 32 (Fig. 6) from the stationary framework of the conveyor. The receiving end of the discharge chute 30 is above the level of liquid in tank 10, so that the discharge of annealed casings from the tank is not accompanied by discharge of cooling liquid.

Figure 2:
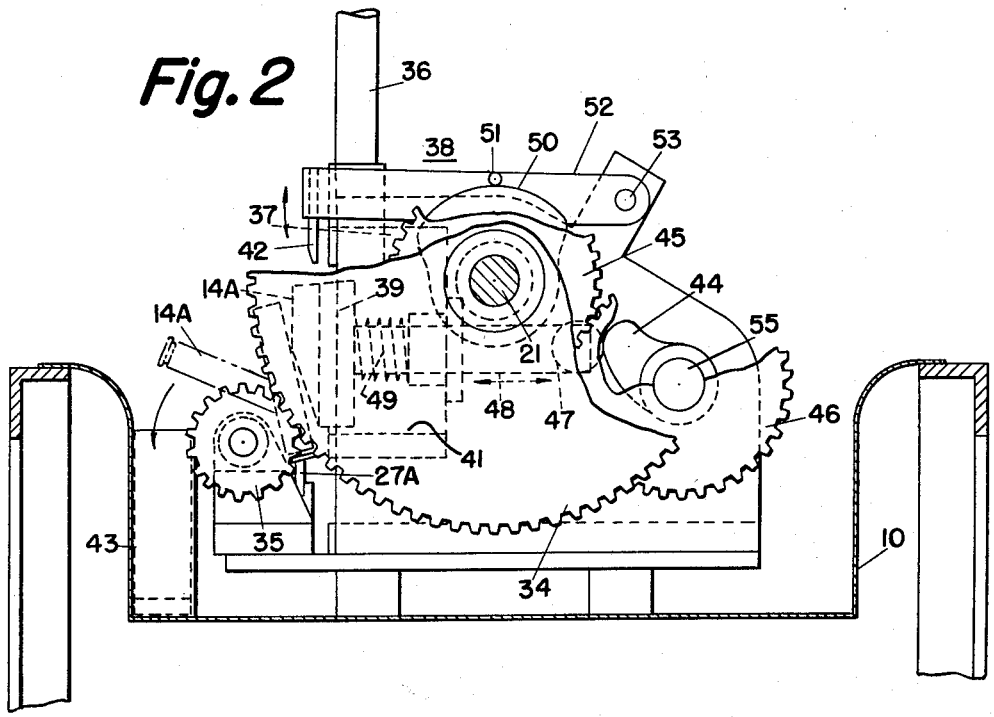
Fig. 2 is an end elevational view taken on line 2—2 of Fig. 1.
Figure 3:
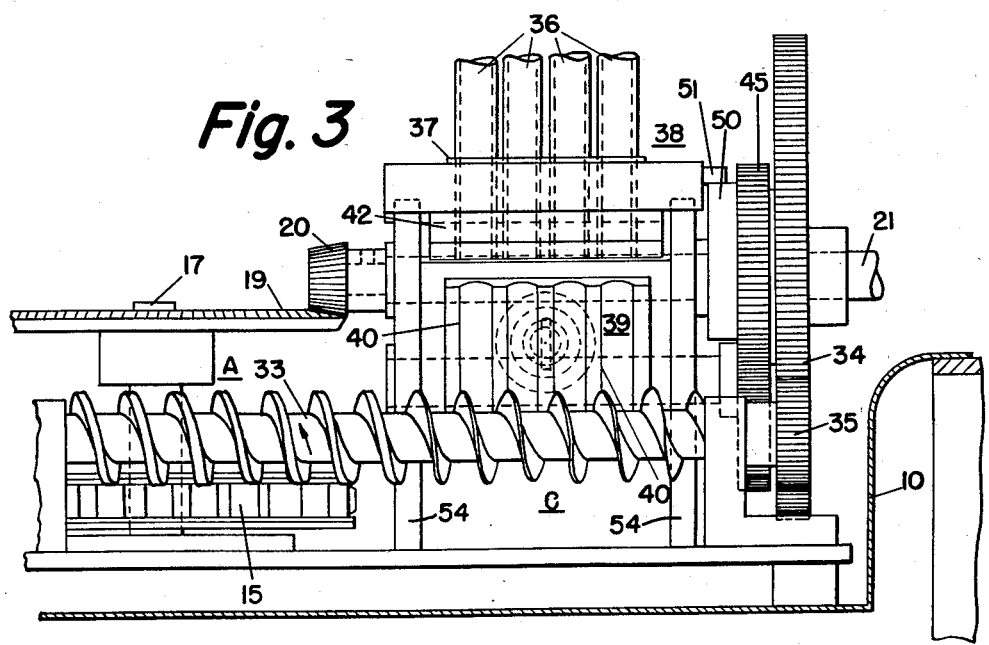
Fig. 3 is a side elevational view taken on line 3—3 of Fig. 1.

The shell casings are fed to conveyor 15 by a coarse worm 33 (Figs. 1, 3 and 6). The lower ends of the casings during their feed by the worm rest upon the extension 27A (Figs. 1 and 2) of rail 27. Each vertically disposed casing is received by the gap between adjacent turns of the worm and is also engaged by the inner guide 85 which is substantially tangent to the path of the conveyor rolls 25 at the receiving station A of conveyor 15. The pitch of the worm 33 matches the axial spacing of the conveyor rolls 25 and the drive of the worm through gears 34, 35 (Figs. 1 and 3) is so synchronized that the gap between each pair of rollers receives, as it moves to station A, a casing being advanced in the gap between adjacent turns of the worm 33. Thus, at the receiving station, the shell casings are advanced in closed pockets defined by the conveyor rolls 25 and the thread of the worm 33. Beyond the receiving station A, the continued transport of the casings is effected by conveyor 15 alone, as above described, and the pockets in which the advancing casings are advanced are defined by conveyor rolls 25 and the outer guide 28 which begins at the discharge end of worm 33.

As apparent from the foregoing description, the casings as continuously fed by worm 33 to conveyor 15, and as continuously advanced by conveyor 15 through the annealing zone or equivalent, are in a single stream of vertical casings disposed side-by-side.

As now described, the casings as delivered to the transfer station C are in a multiplicity of columns in which the casings are disposed end-to-end in the respective delivery tubes 36 (Figs. 1, 2, 3 and 6). The lower ends of the delivery tubes are received by the block 37 of a transfer mechanism 38 having a reciprocating slide 39. The front face (Fig. 3) of the slide is provided with grooves 40, which for the retracted position of the slide, are in alignment with and form continuations of the respective delivery tubes 36. Thus, with the slide in such position, there is exposed at the open front face of block 37 for transfer to worm 33 a group of casings corresponding in number to the number of delivery tubes. These lowermost casings of the columns rest upon the bottom 41 (Fig. 2) of the block 37 somewhat above the extension 27A of the bottom guide rail 27. Bouncing of the casings out of the transfer block as they are permitted to fall from the delivery tubes 36 and into position in front of the retracted slide 39 is precluded by the gate 42, which for such position of the slide is in its lower position, blocking the path of movement of the casings from the open-front slide-compartment of transfer block 37.

As the slide 39 is moved toward its forward position (Fig. 2), the gate 42 is lifted so that a group of vertically disposed casings is pushed by the slide out of the transfer block 37 and so permitted to fall into the series of gaps between successively adjacent turns of the worm 33.

If any one or more casings of the group are improperly oriented, i.e., having its heavier primer-end uppermost, such casing (exemplified by casing 14A of Figs. 2 and 6) does not remain in the corresponding gap but topples over the worm 33 into a collecting basket 43 (Figs. 1 and 2). Thus, the wrong ends of improperly oriented casings are not annealed and the casings so rejected at the transfer station and collected in basket 43 may be returned to any of the feed hoppers of delivery tube 36 for subsequent processing.

The properly oriented casings lie at an angle (Fig. 6) with their sides resting upon the root diameter of the worm 33 and their heavy bottom ends resting on the rail extension 27A (Fig. 2). As the worm advances the retained casings into engagement with plate 85 (Figs. 1 and 6), they are progressively tilted to vertical position and are successively transferred in such position to conveyor 15.

As the slide 39 moves to its advanced position to discharge a group of casings to worm 33, the upper end of the slide blocks the lower ends of the delivery tube 36 to support the lowermost casings of the columns in the delivery tubes. As the slide 39 moves back to its retracted position, this next group of lowermost casings falls into the transfer block compartment in front of slide 39 and in alignment with the respective grooves 40 of the slide. These casings are there temporarily retained by the gate 42 which has in the meantime descended to its lower position. Thus, for each cycle of slide 39, a group of vertically disposed casings is segregated from the columns in the delivery tubes 36 and transferred in side-by-side relation to the feed worm 33.

The root diameter of the worm 33 is covered with plastic or equivalent to minimize the bounce otherwise caused by impact of the metal casings with the metal root of the worm. Plastic may be applied as a strip of vinyl plastic of about 1/8" thickness cemented in the base of the spiral thread of the worm. The rail 27, or at least its extension 27A at the transfer station, is also non-metallic to minimize bounce: it may, for example, be a thermosetting plastic strip impregnated with fibres of nylon or the like.

The horizontal reciprocation of the transfer slide 39 is effected by the cam 44 (Figs. 1, 2) which is continuously driven from the main shaft 21 by a gear train including gears 45, 46. The cam 44 engages the cam follower roller 47 at the end of the push rod 48 which is biased as by compression spring 49 to its forward position.

The ratio between the revolutions of the feed worm 33 and the reciprocations of the slide 39, as determined by the gear ratios of the worm and cam drives, corresponds with the number of delivery tubes so as to form an unbroken stream of continuously moving casings in the feed worm 33 and conveyor 15 from the groups of casings intermittently fed from the columns of casings in the delivery tubes. Furthermore, the worm and cam drives are so synchronized that at the time of discharge of a group of casings from the transfer block 37, the gaps between successive adjacent turns of the feed worm are respectively in alignment with the corresponding grooves 40 of the slide 39. To make such synchronization less critical at the transfer station C and yet preclude the possibility of casings jamming at the receiving station A, the thickness of the worm thread at station C is appreciably less than at station A. Thus, as shown in Figs. 1 and 3, the gap between adjacent turns of the thread at station C is appreciably greater than the diameter of the casings, whereas at the conveyor-receiving station A the gap between adjacent turns of the thread is only slightly greater than the casing diameter. Thus, even when the casings are being processed at high rate, there is no jamming at either the transfer station or the conveyor-receiving station.

The vertical reciprocation of the gate 42 is effected by cam 50 (Figs. 1 and 2) driven from main shaft 21 and engaging the cam-follower pin 51 extending from one of the arms 52 of the gate mechanism. The arms 52 are pivotally supported by stud shafts 53 extending from the frame members 54 which are also provided with bearings for the main drive shaft 21 and the cam shaft 55.

By the apparatus described, 30 calibre shell casings have been satisfactorily annealed at their open ends at rates as high as 430 casings per minute and without appreciable loss of hardness of the ejector ends of the casings. Further, all improperly oriented casings were automatically ejected by the apparatus before annealing of the wrong end in avoidance of subsequent drawing difficulties and loss of casings by rejection as scrap.

The same conveyor and guide arrangement may be used for feeding shell casings in vertical side-by-side relation with their closed primer ends uppermost for hardening heat-treatment. In such case, the hold-down rail 56 of Fig. 4 is omitted or removed and a hold-down rail 56A of quartz or like material of high electrical and thermal resistance is disposed (Fig. 7) along the underface of the top of the induction heater tunnel H for engagement by the closed upper ends of the casings. Also, for such heat-treatment, the heating zone may terminate at or immediately ahead of the discharge station B and at such station the casings as lifted up and away from the conveyor 15 are discharged into a quenching tank 71 (Fig. 8) through an open bottom compartment defined by a reentrant wall section 57 of tank 10. Also in such case, since the casings are now dropped to the feed worm with their heavy ends uppermost, a hold-in plate 58 is disposed (Figs. 9, 10) above and along the feed worm at the transfer station to retain the casings so oriented in the feed worm gaps in advance to conveyor 15.

The casings, as delivered to the transfer block, should for this use of the apparatus be primer-end uppermost. Usually, however, the casings as delivered from a hopper to the receiving ends of the feed tubes 36 are closed-end downward. To deliver the casings closed-end uppermost to the transfer block 37, and to eject reversely oriented casings, the mechanism shown in Fig. 11 is interposed in the feed tube system.

When the reciprocating slide 59 is in the retracted position shown, each of its chambers 60 receives a casing from the corresponding feed tube section 36A. When the slide 59 is moved to the left, its chambers 60 respectively come into alignment with the corresponding apertures 61 of bottom plate 62 and the group of casings fall freely in parallel open-front chutes into each of which projects a biased finger 63. If the falling casing is properly oriented, i.e., closed-end lowermost, the finger 63 is merely rocked about its pivot 64 clear of the casing and the casing continues to fall through the chute and thence into and through the feed tube section 36B.

The drum 65 rotatable about a horizontal axis below the feed tube sections 36B is provided with a plurality of axially spaced series of radial chambers 66. The chambers of each series are angularly spaced, and each in turn is moved into alignment with the corresponding feed tube section 36B as the drum is rotated step-by-step. For each stepping operation, a group of casings is received, closed-end lowermost, by the uppermost group of chambers 66 spaced axially of the drum. After the first few stepping cycles, a group of casings is delivered, closed-end uppermost, from the drum 65 to the corresponding feed tube sections 36C which extend downwardly to the transfer device 38 previously described.

While the groups of casings are being inverted by drum 65, they are prevented from prematurely falling out of the drum by the retainer plate 67 or equivalent which extends along the drum and upwardly from the support 68 of the receiving ends of the feed tube sections 36B in close proximity to the peripheral surface of the drum.

The mechanism for actuating the slide 59 effects one cycle of reciprocation for each step of drum 65 and for each cycle of the reciprocation of slide 39 to maintain, under normal operating conditions, the intermittent feed of groups of casings at a rate which keeps the conveyor 15 filled with casings having their closed ends uppermost.

As above stated, if a casing falls through an aperture 61 with its closed end down, it merely rocks the finger 63 out of its path and continues on to the inverter 65 and eventually to conveyor 15. If, on the other hand, a casing falls through an aperture 61, with its open end lowermost, the finger 63 enters into the open end of the casing which, under its momentum, swings counter-clockwise in an arc determined by the pivot of the finger 63. Such motion brings the closed end of the casing outside of the chute with its lower side striking the bar 69 adjustably positioned below the finger pivot. The casing thereupon falls outwardly and away from the normal path of movement of the properly oriented casings. As soon as the improperly oriented casing is thus ejected, the finger 63 returns to the original position (Fig. 11) to which biased by its weighted tail section. The normal standby position of each of the rejection fingers 63 may be preset by adjustment of the corresponding stop 70. The mechanism shown in Fig. 11 is more fully illustrated, described and claimed in my copending application Serial No. 716,324, filed February 20, 1958, and issued on October 6, 1959, as Letters Patent 2,907,858.

Although particularly suited and designed for the heat-treatment of a selected end of shell casings, the apparatus with little or no material changes may be used with like advantages for high-speed precisely-positioned handling and uniformity of heat-treatment of a selected end of other objects, such as studs, bolts and the like.

What is claimed is:

1. In an apparatus suited for heat-treating shell casings comprising a tank for containing liquid and a heating device for providing a heating zone above the liquid, casing-feeding means including a conveyor having vertically spaced pockets for receiving said casings to transport them in vertical side-by-side relation through said zone to a discharge station, a feed-worm having spaces between adjacent thread turns corresponding with the spacing of said conveyor pockets and extending adjacent said conveyor at a casing-receiving station, and a reciprocating slide having grooves for receiving in each cycle of reciprocation a group of casings concurrently transferred to corresponding spaces between adjacent threads of the feed-worm, casing-positioning means comprising structure below said conveyor pockets for supporting said casings with their lower ends submerged in said liquid and with the upper ends extending above said pockets and said liquid in a path of movement including said heating zone, and means at said discharge station for removing the casings from the conveyor and said liquid.

2. An apparatus as in claim 1 in which said structure for engaging the lower ends of the casings includes an extension disposed adjacent and along the feed-worm to engage the bottom ends of the groups of casings transferred by the reciprocating slide, and in which the root of the feed-worm and said extension are at least faced with plastic to suppress bounce-back of the casings.

3. An apparatus as in claim 1 in which at the conveyor-receiving station the thickness of the worm-thread provides a gap between adjacent thread turns closely corresponding with the casing diameter and which at the transfer station is reduced to provide a gap between adjacent thread turns which appreciably exceeds the casing diameter.

4. An apparatus as in claim 2 in which said extension is slightly below the axis of rotation of said worm so that improperly oriented casings topple over the worm and are not retained for transfer to the conveyor and transport thereby through said heating zone.

5. An apparatus as in claim 1 in which the center-to-center spacing of conveyor pockets and of said slide grooves corresponds with the pitch of said feed-worm, in which the conveyor and worm drives are synchronized for mating of the conveyor pockets with the worm-thread gaps at the receiving station, in which the worm and slide drives are synchronized for intermittent feeding movement of the slide with said grooves in alignment with the worm-thread gaps at the time of free-fall of successive groups of casings from the slide, and in which the ratio of the worm and slide drives corresponds with the number of casings per group.

6. Apparatus for handling shell casings comprising an endless conveyor disposed in a substantially horizontal plane and comprising a plurality of rollers having vertical axes spaced along the conveyor to define gaps for receiving the casings in vertical side-by-side relation, a casing feed-worm rotatable about a horizontal axis extending parallel to and adjacent the path of said rollers, means for intermittently feeding groups of casings to fall into the gaps between adjacent turns of the feed-worm, said casings as received by the feed-worm lying at an angle inclined from vertical, structure disposed below said axis of the feed-worm and the path of said rollers for engagement by the lower ends of the casings as received by the feed-worm and as advanced thereby into the gaps between said conveyor rollers, and plate structure extending upwardly and along the side of said feed-worm to erect the casings fed thereto as they are advanced by said feed-worm toward the path of said conveyor rollers.

7. Apparatus as in claim 6 in which the worm thread adjacent said group-feeding means is of reduced thickness, thus to provide gaps appreciably wider than the diameter of said casings.

8. An apparatus suited for heat-treating shell casings comprising a tank for containing liquids, a heating device for providing a heating zone above said liquid, casing feeding means including an endless conveyor submerged in said liquid and having vertically spaced pockets for receiving said casings to transport them in vertical side-by-side relation through said zone to a discharge station, said pockets being each defined by a pair of rollers which are spaced to engage a casing at regions angularly spaced about its vertical axis, said rollers extending upwardly from the conveyor and rotatable about vertical axes spaced lengthwise of the conveyor, rail structure extending along said conveyor below said conveyor pockets and in said liquid for supporting said casings with their lower ends submerged in said liquid and with their upper ends extending above said pockets and said liquid in a path of movement including said heating zone, track members disposed on opposite sides of said rollers and respectively engaging said rollers and the supported casings continuously to effect rotation of the casings about their vertical axes while moved by the conveyor through and beyond said heating zone in obtainment of uniformity of heating of the upper portions of the casings and of heat-transfer from the lower submerged ends of the casings, and means at said discharge station for removing the casings from the conveyor and from said liquid.

9. An apparatus suited for heat-treating shell casings comprising a tank for containing liquid, a heating device for producing a heating zone above said liquid, said heating device producing an alternating magnetic field for heating of the casings by induction, casing-feeding means including an endless conveyor submerged in said liquid and having vertically spaced pockets for receiving said casings to transport them in vertical side-by-side relation through said zone to a discharge station, casing-positioning means comprising rail structure extending along said conveyor below said conveyor pockets and in said liquid for supporting said casings with their lower ends submerged in said liquid and with their upper ends extending above said pockets and said liquid in a path of movement including said heating zone, means for effecting rotation of the casings about their vertical axes while subjected to said alternating magnetic field, a hold-down guide extending into the ejector grooves of the casings to prevent their upward movement by said magnetic field while permitting their aforesaid rotation, and means at said discharge station for removing the casings from the conveyor and said liquid.

References Cited in the file of this patent

UNITED STATES PATENTS

| 232,882 | Bennett | Oct. 5, 1880 |
| 572,590 | Wilson et al. | Dec. 8, 1896 |
| 1,602,669 | Hansen | Oct. 12, 1926 |
| 2,159,318 | Carter | May 23, 1939 |
| 2,604,200 | Hohl et al. | July 22, 1952 |
| 2,647,199 | Wharff | July 28, 1953 |